(12) United States Patent
Tzannes et al.

(10) Patent No.: US 8,335,271 B2
(45) Date of Patent: *Dec. 18, 2012

(54) SYSTEMS AND METHODS FOR IMPLEMENTING RECEIVER TRANSPARENT Q-MODE

(75) Inventors: Marcos C. Tzannes, Orinda, CA (US); Arnon Friedmann, Marlboro, MA (US)

(73) Assignee: TQ Delta, LLC, Austin, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/783,749

(22) Filed: May 20, 2010

(65) Prior Publication Data

US 2010/0290558 A1 Nov. 18, 2010

Related U.S. Application Data

(63) Continuation of application No. 12/478,577, filed on Jun. 4, 2009, now abandoned, which is a continuation of application No. 11/674,871, filed on Feb. 14, 2007, now Pat. No. 7,558,329, which is a continuation of application No. 11/434,249, filed on May 16, 2006, now abandoned, which is a continuation of application No. 11/200,002, filed on Aug. 10, 2005, now abandoned, which is a continuation of application No. 10/802,867, filed on Mar. 18, 2004, now abandoned, which is a continuation of application No. 10/106,329, filed on Mar. 27, 2002, now Pat. No. 6,731,695.

(60) Provisional application No. 60/278,936, filed on Mar. 27, 2001, provisional application No. 60/283,467, filed on Apr. 12, 2001, provisional application No. 60/287,968, filed on May 1, 2001, provisional application No. 60/293,034, filed on May 23, 2001.

(51) Int. Cl.
*H04L 5/12* (2006.01)
(52) U.S. Cl. ........................................ 375/265; 375/261
(58) Field of Classification Search .................. 375/219, 375/222, 259, 260–262, 265, 316, 329, 332
See application file for complete search history.

(56) References Cited

U.S. PATENT DOCUMENTS

| | | |
|---|---|---|
| 3,925,611 A | 12/1975 | Dennis |
| 4,761,646 A | 8/1988 | Choquet et al. |
| 4,943,980 A | 7/1990 | Dobson et al. |

(Continued)

FOREIGN PATENT DOCUMENTS

EP 1199858 4/2002

(Continued)

OTHER PUBLICATIONS

U.S. Appl. No. 12/783,755, filed May 20, 2010, Tzannes et al.

(Continued)

*Primary Examiner* — Young T. Tse
(74) *Attorney, Agent, or Firm* — Jason H. Vick; Sheridan Ross, PC

(57) ABSTRACT

In a receiver transparent Q-mode, i.e., a Q-mode that is only implemented by a transmitter, the receiver is unaware of the Q-mode state of the transmitter. In this type of Q-mode configuration, the transmitter could enter and exit Q-mode as desired while the receiver, could, for example, continue to function as if operating normally, such as in "showtime." Through this approach, it is not necessary for the receiver to detect the transmitter's entry and exit of Q-mode.

13 Claims, 6 Drawing Sheets

U.S. PATENT DOCUMENTS

| | | | |
|---|---|---|---|
| 5,363,408 | A | 11/1994 | Paik et al. |
| 5,774,640 | A * | 6/1998 | Kurio .......................... 714/4.3 |
| 6,005,893 | A | 12/1999 | Hyll |
| 6,026,120 | A | 2/2000 | Betts |
| 6,052,411 | A | 4/2000 | Mueller et al. |
| 6,130,918 | A | 10/2000 | Humphrey et al. |
| 6,201,830 | B1 | 3/2001 | Chellali et al. |
| 6,226,323 | B1 | 5/2001 | Tan et al. |
| 6,314,146 | B1 | 11/2001 | Tellado et al. |
| 6,396,912 | B1 * | 5/2002 | Mueller et al. ............ 379/93.32 |
| 6,654,410 | B2 | 11/2003 | Tzannes |
| 6,731,695 | B2 | 5/2004 | Tzannes et al. |
| 6,853,686 | B1 | 2/2005 | Cupo et al. |
| 6,952,417 | B1 * | 10/2005 | Posthuma .................... 370/360 |
| 6,961,369 | B1 | 11/2005 | Tzannes |
| 7,010,028 | B2 | 3/2006 | Carlson |
| 7,054,379 | B2 | 5/2006 | Carlson et al. |
| 7,177,350 | B1 * | 2/2007 | Long et al. .................... 375/222 |
| 7,558,329 | B2 | 7/2009 | Tzannes et al. |
| 2002/0080867 | A1 | 6/2002 | Abbas et al. |
| 2002/0137467 | A1 * | 9/2002 | Tzannes .......................... 455/69 |
| 2002/0159532 | A1 | 10/2002 | Wight |
| 2002/0181609 | A1 | 12/2002 | Tzannes et al. |
| 2003/0039306 | A1 | 2/2003 | Redfern |
| 2004/0184552 | A1 | 9/2004 | Tzannes et al. |
| 2006/0039490 | A1 | 2/2006 | Tzannes et al. |
| 2006/0203927 | A1 | 9/2006 | Tzannes et al. |
| 2009/0290620 | A1 | 11/2009 | Tzannes et al. |

FOREIGN PATENT DOCUMENTS

| | | |
|---|---|---|
| WO | WO 01/76118 | 10/2001 |

OTHER PUBLICATIONS

"Establishing the need for dynamic power saving in ADSL G.992.x", Alcatel Bell, ITU-T D.835, Geneva, Apr. 2000.

ITU—Telecommunication Standardization Sector, "G.gen: The impact of non-stationary crosstalk on legacy ADSL modems—preliminary analysis," Antwerp, Belgium; Jun. 19-23, 2000, 9 pages.

ITU—Telecommunication Standardization Sector, "G.gen: G.dmt. bis: G.lite.bis: Proposal for Q-Mode," Clearwater, Florida; Jan. 8-12, 2001, 2 pages.

ITU—Telecommunication Standardization Sector, "G.gen: Semi stationary Q-mode signal—A more flexible definition," Clearwater; Florida Jan. 8-12, 2001, 7 pages.

ITU—Telecommunication Standardization Sector, "G.gen: semi stationary Q-mode—detailed signal definition," Huntsville, Canada; Jul. 31-Aug. 4, 2000, 4 pages.

ITU—Telecommunication Standardization Sector, "G.gen: Semi-stationary quiescent mode signal," Antwerp, Belgium; Jun. 19-23, 2000, 4 pages.

ITU—Telecommunication Standardization Sector, "G.gen-bis—Defining a Reverb-like stationary Q-mode "filler" signal," Geneva; Feb. 5-9, 2001, 3 pages.

ITU—Telecommunication Standardization Sector, G.gen: Flexible 4-QAM Q-Mode Signal, Goa, India; Oct. 23-27, 2000, 2 pages.

International Search Report for PCT/US02/09411, mail date Jul. 3, 2002.

Written Opinion for PCT/US02/09411, mail date Jul. 11, 2003.

International Preliminary Examination Report for PCT/US02/09411, mail date Mar. 2, 2004.

Office Action for European Application No. 02717728.6, mailed May 11, 2004.

Official Action for U.S. Appl. No. 11/674,871, mailed Jan. 8, 2008.

Official Action for U.S. Appl. No. 11/674,871, mailed Oct. 1, 2008.

Notice of Allowance for U.S. Appl. No. 11/674,871, mailed May 4, 2009.

Official Action for U.S. Appl. No. 10/106,329, mailed Jun. 20, 2003.

Notice of Allowance for U.S. Appl. No. 10/106,329, mailed Feb. 9, 2004.

Official Action (Restriction Requirement) for U.S. Appl. No. 10/802,867, mailed Jan. 12, 2005.

Official Action for U.S. Appl. No. 10/802,867, mailed May 10, 2005.

Official Action for U.S. Appl. No. 11/200,002, mailed Feb. 7, 2006.

Official Action (Restriction Requirement) for U.S. Appl. No. 11/434,249, mailed Sep. 7, 2006.

Official Action for U.S. Appl. No. 11/434,249, mailed Nov. 15, 2006.

Official Action for U.S. Appl. No. 12/478,577, mailed Jan. 7, 2011.

Official Action for U.S. Appl. No. 12/783,755, mailed Nov. 14, 2011.

ITU G.992.1 "Asymmetric Digital Subscriber Line (ASDL) Transceivers" Jun. 1999, 256 pages.

Itu G.992.2 Splitterless Asymmetric Digital Subscriber Line (ASDL) Transceivers, Jun. 1999, 179 pages.

* cited by examiner

Q-Mode {+,-} Constellation Point

64-QAM Constellation

SYSTEMS AND METHODS FOR IMPLEMENTING RECEIVER TRANSPARENT Q-MODE

RELATED APPLICATION DATA

This application is a Continuation of U.S. application Ser. No. 12/478,577, filed Jun. 4, 2009 now abandoned, which is a Continuation of U.S. application Ser. No. 11/674,871, filed Feb. 14, 2007, now U.S. Pat. No. 7,558,329, which is a Continuation of U.S. application Ser. No. 11/434,249, Filed May 16, 2006 now abandoned, which is a Continuation of U.S. application Ser. No. 11/200,002, filed Aug. 10, 2005 now abandoned, which is a continuation of U.S. patent application Ser. No. 10/802,867, filed Mar. 18, 2004 now abandoned, which is a Continuation of U.S. patent application Ser. No. 10/106,329, filed Mar. 27, 2002, now U.S. Pat. No. 6,731,695, issued May 4, 2004, which claims the benefit of and priority to U.S. Provisional Application Ser. No. 60/278,936 filed Mar. 27, 2001, entitled "Receiver Transparent Q-Mode," U.S. Provisional Application Ser. No. 60/283,467 filed Apr. 12, 2001, entitled "Receiver Transparent Q-Mode With On-Line Reconfiguration," U.S. Provisional Application Ser. No. 60/287,968 filed May 1, 2001, entitled "Receiver Transparent Q-Mode With On-Line Reconfiguration And Scrambling," and U.S. Ser. No. 60/293,034 filed May 23, 2001, entitled "Receiver Transparent Q-Mode With On-Line Reconfiguration And Scrambling And Q-Mode Symbol Distortion," all of which are incorporated herein by reference in their entirety.

BACKGROUND OF THE INVENTION

1. Field of the Invention

This invention general relates to multicarrier communication systems. In particular, this invention relates to systems and methods that allow a transmitter to enter and exit a Q-Mode.

2. Description of Related Art

Q-mode is being examined by ADSL standards bodies in the ITU-T in the development of the G.dmt.bis and G.lite.bis ADSL standards, both of which are incorporated herein by reference in their entirety. Q-mode is a low power transmission mode intended to save power by transmitting signals with lower PAR (Peak to Average power Ratio) with respect to normal steady state, i.e., full power, signals. The Q-mode signal with low PAR will often have the same average power as the normal steady state signals but since the peak power is reduced, power consumption can be reduced in the analog transmission circuitry. This is very important especially for saving power in telephone company central offices and remote cabinets where ADSL modems are often installed.

Current Q-mode proposals utilize a Q-mode "filler" symbol with low PAR properties in order to save power at the transmitter. Discussion of this type of approach can be found in various ITU Documents, such as, BA-044, BA-045, HC-029R1, CF-033 and CF-040, all of which are incorporated herein by reference in their entirety. Other ITU proposals state that the filler symbol should be defined by the transmitter and communicated to the receiver during initialization, see BI-080 and D.87, both of which are also incorporated herein by reference in their entirety.

SUMMARY OF THE INVENTION

However, current systems suffer from a number of drawbacks. These exemplary drawbacks include the necessity of receivers being required to implement circuitry to detect Q-mode symbols on every DMT symbol. Furthermore, the entry and exit modes associated with the Q-mode lack robustness since the receiver needs to be able to distinguish a Q-mode symbol from a real information-carrying symbol.

In contrast, the exemplary systems and methods of this invention focus on a receiver transparent Q-mode, i.e., a Q-mode that is only implemented by the transmitter, wherein the receiver is unaware of the Q-mode state of the transmitter. In this type of Q-mode configuration, the transmitter could enter and exit Q-mode as desired while the receiver, could, for example, continue to function as if operating normally, such as in "showtime." Through this approach, it is not necessary for the receiver to detect the entry and exit of Q-mode by the transmitter.

Accordingly, exemplary aspects of the present invention relate to multicarrier communications systems. In particular, an exemplary aspect of the invention relates to conserving power at a transmitter.

Additionally, aspect of the present invention relate to allowing a transmitter to enter into a Q-mode while the receiver is unaware of the operational state of the transmitter.

Aspects of the present invention also relate to eliminating the need for a receiver to have Q-mode entry and exit detection capabilities.

Aspects of the present invention also relate to seamless changing into and out of a Q-mode between a transmitter and a receiver.

Additional aspects of the present invention relate to sending a plurality of symbols from a transmitter to a receiver wherein the receiver does not need to determine which of the symbols is a Q-mode symbol.

These and other features and advantages of this invention are described in, or are apparent from, the following detailed description of the embodiments.

BRIEF DESCRIPTION OF THE DRAWINGS

The embodiments of the invention will be described in detailed, with reference to the following figures, wherein.

DETAILED DESCRIPTION OF THE INVENTION

Figure 1:
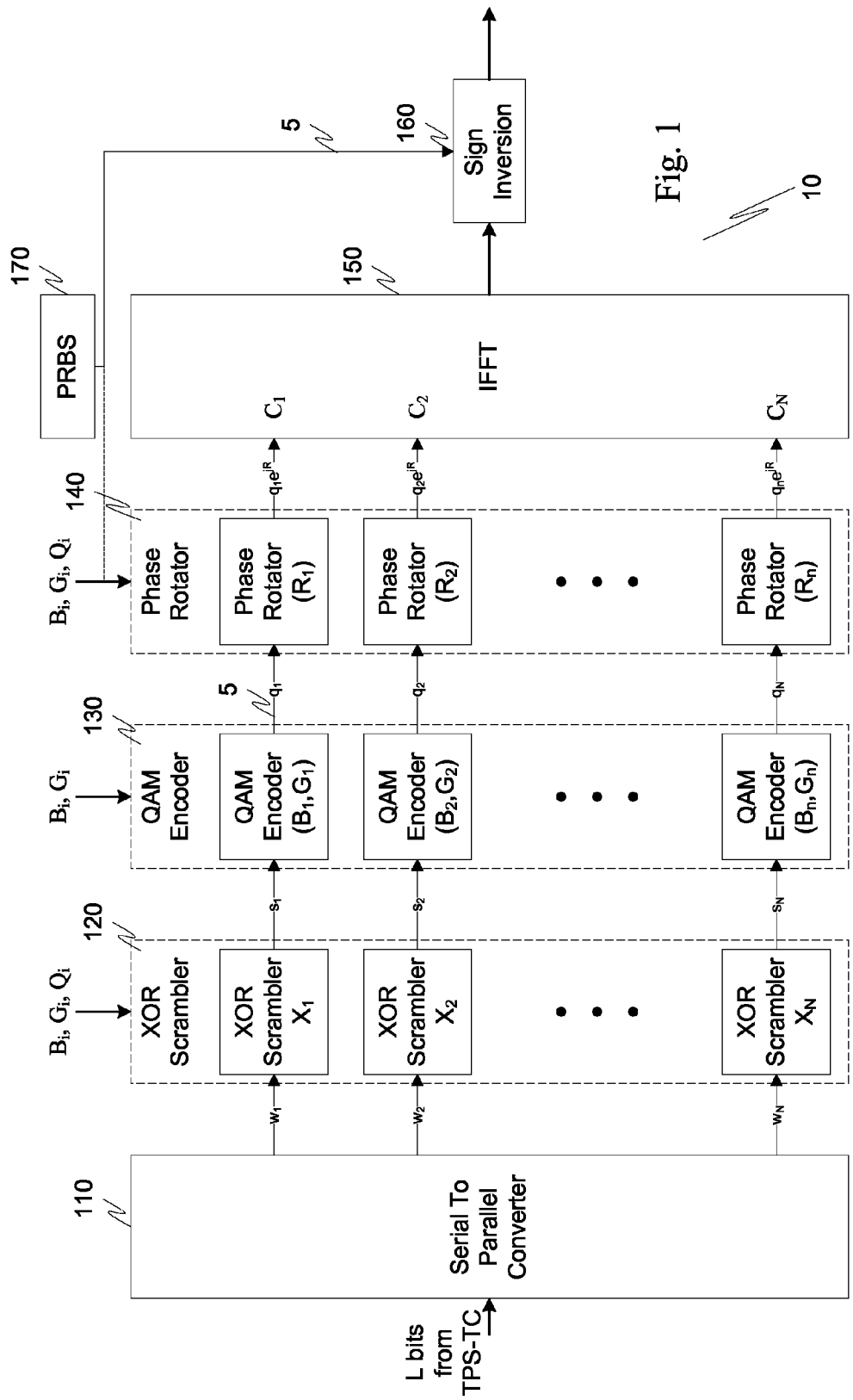
FIG. 1 is a block diagram illustrating an exemplary portion of a transmitter according to this invention.

FIG. 1 illustrates an exemplary transmitter according to an embodiment of this invention. In particular, the transmitter 10 comprises a serial to parallel converter 110, an XOR scrambler 120, a QAM (quadrature amplitude modulation) encoder 130, a phase rotator 140, an Inverse Fast Fourier Transform module 150, a sign inversion module 160 and a pseudo-random bit sequence (PRBS) module 170, all interconnected by links 5.

The exemplary systems and methods of this invention will be described in relation to a multicarrier modulation communication system. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in a variety of ways beyond these specific details.

While the exemplary embodiments illustrated herein show the various components of the transmitter, and corresponding receiver, collocated, it is to be appreciated that the various components of the system can be located a distant portions of a distributed network, such as a telecommunications network and/or the Internet or within a dedicated communications network. Thus, it should be appreciated that the components of the transmitter and receiver, respectively, can be combined into one or more devices or collocated on a particular note of a distributed network, such as a telecommunications network. As will be appreciated from the following description, and for reasons of computational efficiency, the components of the communications network can be arranged at any location within the distributed network without affecting the operation of the system.

Furthermore, it should be appreciated that the various links connecting the elements can be wired or wireless links, or a combination thereof, or any known or later developed element(s) that is capable of supplying and/or communicating data to and from the connected elements.

As used herein, the following nomenclature is represented by the following symbols wherein:
N total number of carriers used for transmission
$C_i$ the $i^{th}$ carrier, where $I=0 \ldots N$
$B_i$ the number of bits modulated by $C_i$ (as defined by the receiver during training)
$G_i$ the fine gain of $C_i$ (as defined by the receiver during training)
$Q_i$ the 4-QAM constellation point of $C_i$ of the Q-mode symbol (as defined by the transmitter)
$w_i$ the input bit word to be modulated on $C_i$ (with the length of this word being $B_i$ bits)
$s_i$ the XOR scrambled $w_i$
$q_i$ the QAM symbol of $C_i$
$X_i$ the XOR scrambler bit values for $C_i$ and
$R_i$ the phase rotation value of $C_i$ In operation, L bits are received from a transmission protocol specific-transmission convergence layer (not shown) and converted, with the cooperation of the serial to parallel converter 110, into $w_N$ words. These $w_N$ words are then processed by the XOR scrambler 120 and phase rotator 140, which work in cooperation, to map an "all zeros" input word ($w_i$) of the $i^{th}$ carrier to a point in a constellation defined by $B_i, G_i$ that is closest to the 4-QAM Q-mode constellation point ($Q_i$) for that carrier. At the receiver, not illustrated, the inverse operations are performed.

As discussed above, an exemplary purpose of the XOR scrambler 120 and the phase rotator 140 is to map the "all zeros" input word ($w_i$) to the constellation point that is closes to the Q-mode constellation point ($Q_i$) for each carrier. As a result, a different PMD scrambler and phase rotation is defined for each carrier. The XOR scrambler 120 and phase rotator 140 depend on, for example, the QAM constellation size ($B_i$) of the carrier, the fine gain ($G_i$) of the carrier and the Q-mode 4-QAM constellation point ($Q_i$) of the carrier which can be, for example, defined by the transmitter or receiver.

Figure 2:
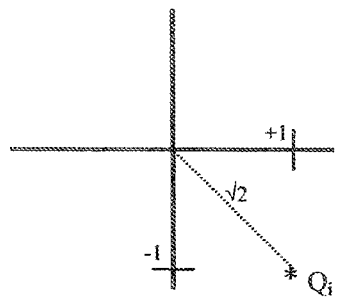
FIG. 2 illustrates an exemplary constellation point according to this invention.
Figure 3:
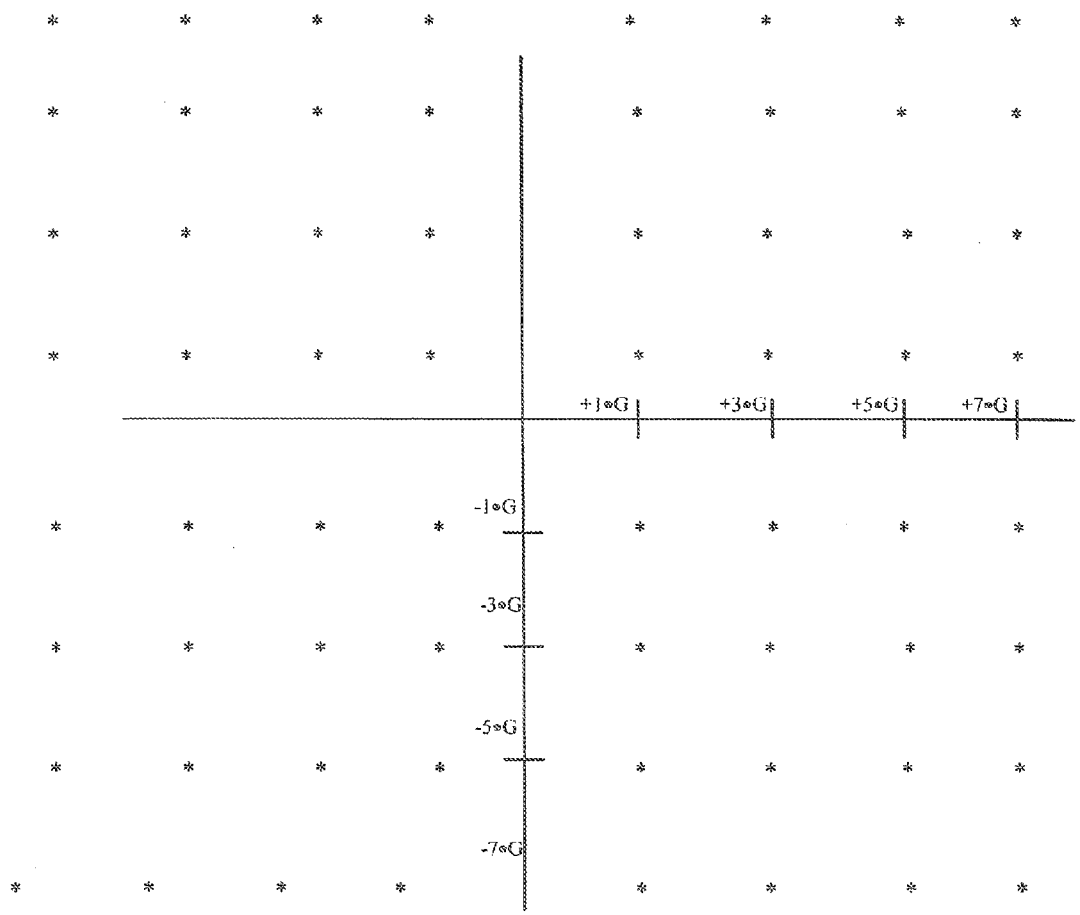
FIG. 3 illustrates an exemplary 64-QAM constellation according to this invention.

As illustrated in FIG. 1, the XOR scrambler 120 and phase rotator 140 operate on a carrier by carrier bases. Thus, as illustrated in exemplary FIG. 2, and assuming that the carrier has been specified by the transmitter to utilize $Q_i=\{+,-\}$ or $\{0,1\}$ for the Q-mode symbol, the XOR scrambler bits ($X_i$) and the phase rotation value ($R_i$) of a carrier that has $B_i=6$ bits and a fine gain of $G_i=\sqrt{(21/13)}=1.27$ (2.08 db). After scaling by the factor G, FIG. 3 illustrates the 64-QAM constellation, wherein $G=G_i*$(constellation gain)$=\sqrt{(21/13)}(1/\sqrt{(21)})=\sqrt{(1/13)}$, wherein $1/\sqrt{(21)}$ is the constellation gain scaling for a 64-QAM constellation relative to the 4-QAM constellation. Based on this scaled 64-QAM constellation, the constellation point in the lower right hand quadrant that is closest to the $\{+,-\}$ constellation point of the Q-mode signal in FIG. 1 can be determined A pure phase rotation of the entire constellation allows the use of any 64-QAM constellation point, i.e., not only those on the diagonal. Therefore, the 64-QAM constellation point that has a distance of $\sqrt{(2)}$ from the origin need to be determined since this is the distance of the $Q_i=\{+,-\}$ Q-mode point. The distance from the origin of the 64-QAM constellation points in the lower right hand quadrant are:

$$D(1,1)=G*\sqrt{(1+1)}=\sqrt{(1/13)}*\sqrt{(2)}$$

$$D(1,3)=D(3,1)=G*\sqrt{(1+9)}=\sqrt{(1/13)}*\sqrt{(10)}$$

$$D(1,5)=D(5,1)+G*\sqrt{(26)}=\sqrt{(1/13)}*\sqrt{(26)}=\sqrt{(2)}$$

$$D(3,3)=G*\sqrt{(9+9)}$$

$$D(3,5)+D(5,3)=G*\sqrt{(9+25)}$$

$$D(5,5)=G*\sqrt{(25+25)}$$

$$D(1,7)=D(7,1)=G*\sqrt{(1+49)}$$

$$D(3,7)=D(7,3)=G*\sqrt{(9+49)}$$

$$D(5,7)=D(7,5)=G*\sqrt{(25+49)}$$

$$D(7,7)=G*\sqrt{(49+49)}$$

From the calculation it is apparent that the point at (1,5) has a distance of $\sqrt{(2)}$ from the origin and is chosen as the constellation point to be used for the "all zeros" input word on this exemplary constellation. The (1,-5) constellation point is mapped to the bit pattern $\{010101\}$ in the 64-QAM constellation. Therefore, the scrambler for this constellation point will map the all-zeros word $\{000000\}$ to $\{010101\}$. A simple scrambler that can accomplish this is an XOR of the input word for this constellation with the bit pattern $X_i=10101011$.

Figure 4:
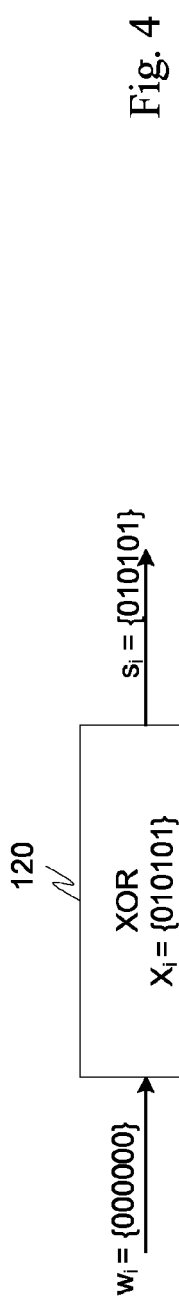
FIG. 4 is a block diagram illustrating an exemplary XOR scrambler according to this invention.

FIG. 4 illustrates an exemplary XOR scrambler that is capable of performing the scrambling set forth in the above example. Specifically, the XOR scrambler receives an input word to be modulated that comprises all zeros, XORs that with the XOR scrambler bit values for C, and outputs the appropriately scrambled XOR scrambled input word $s_i$. As an example, FIG. 4 shows the XOR scrambler for a carrier using the Q-mode constellation shown in FIG. 2 and the 64-QAM constellation shown in FIG. 3 using the fine gain of 2.08 dB.

In addition to the XOR scrambler illustrated in FIG. 4, the phase rotation value $R_i$ needs to be specified in order to migrate the (1,-5) constellation point to the diagonal. A phase rotation of $R=\pi/5.34$ will place the (1,-5) point on the diagonal 64-QAM constellation. Of course, this phase rotation will be applied to the entire 64-QAM constellation thus maintaining the same distance properties and average power for the entirety of the constellation.

Figure 5:
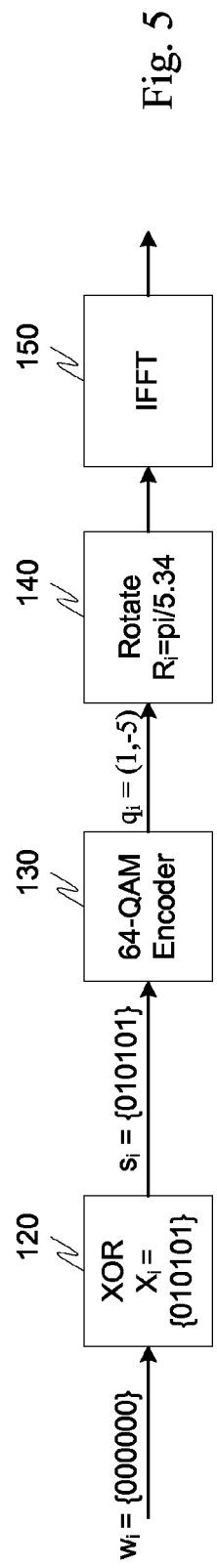
FIG. 5 is a block diagram illustrating an exemplary transmitter having an XOR scrambler and phase rotator for a 64-QAM constellation.

As illustrated in FIG. 5, the phase rotation is applied by the phase rotator 140 after the QAM encoding is performed by, for example, the 64-QAM encoder 130. The result is then passed through the IFFT module 150 and output.

As discussed above, each carrier will have a different XOR scrambler and phase rotation. The parameters for the XOR scrambler 120 and the phase rotation for the phase rotator 140 for each carrier depend on, for example, the QAM constellation size for the particular carrier, the fine gain value used on that carrier and the Q-mode 4-QAM constellation point of that carrier.

Even though not illustrated, at the receiver, the inverse functions to that of the transmitter are performed. Specifically, the received signal is rotated back at the output of an FFT module and descrambled at the output of the QAM decoder to obtain the original input word $w_i$.

Figure 6:
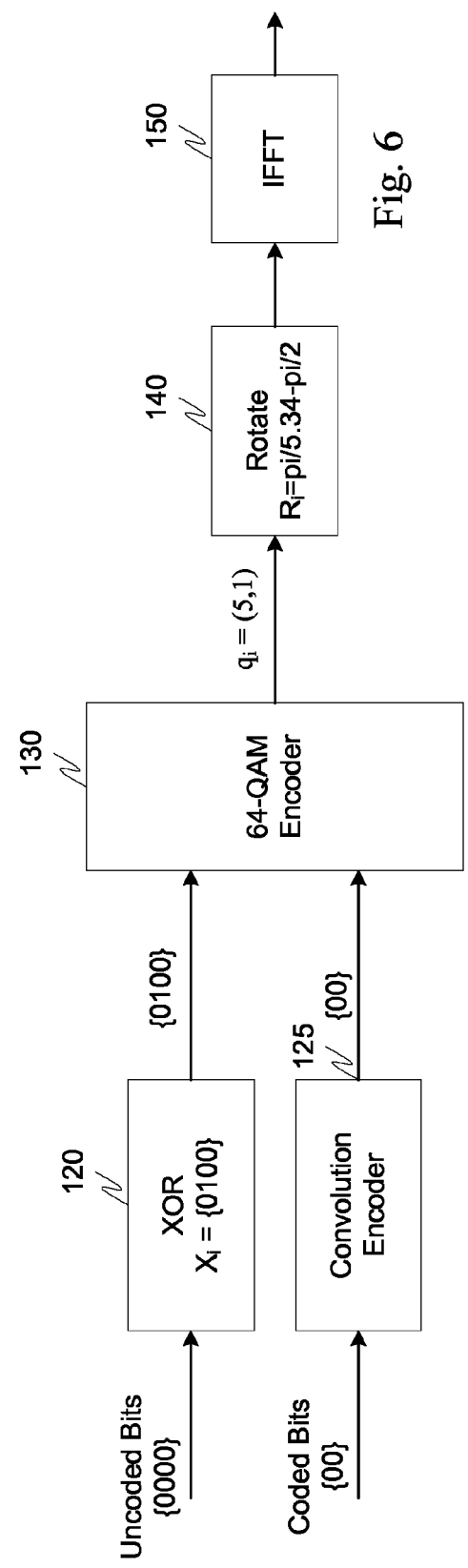
FIG. 6 is a block diagram illustrating an exemplary transmitter having an XOR scrambler and phase rotator for use with trellis coding.

FIG. 6 illustrates an example of XOR scrambling and phase rotation using trellis coding. In particular, where trellis coding is used, the XOR scrambler 120 scrambles only the uncoded bits. The coded bits will pass through the convolution encoder 125 unscrambled. This results in an all-zeros word always being mapped to a constellation point in coset 0. If the constellation point used to map the all-zeros input word to the 4-QAM Q-mode constellation pint is not in coset 0, then the entire constellation can be rotated to produce the correct results.

As an illustrative example, assume trellis coding is used for the above example. In the above example, the chosen constellation point (1,−5) is located in coset 1. However, in the (+,+) quadrant the constellation point (5,1) is located in coset 0. Therefore, rotating the entire constellation by −π/2 will move the (5,1) constellation point to the (1,−5) position and, as a result, the rotated (1,−5) constellation point will be located in coset 0.

FIG. 6 illustrates this encoding process. In particular, the bit values mapped to the unrotated (5,1) constellation point are {010000}. In this case, the XOR scrambler value is $X_i$={0100} is applied by the XOR scrambler 120 to only to the uncoded bits (4MSBs). The coded bits (2LSBs) that designate the coset will be encoded with the convolution encoder 125 without scrambling. The resulting QAM symbol is located in coset 0 at constellation point (5,1). A phase rotation of −π/2 is thus required to move this QAM symbol to the (1,−5) position. Thus the −π/2 phase rotation is added to the phase rotation $R_i$=π/5.34−π/2 by the phase rotator 140.

Alternatively, for example, the XOR mapping is applied to all bits, even when trellis coding is enabled. In this case, however, an additional step is required in the receiver's trellis decoder. Normally, the first step in trellis decoding is to determine the four 2-D metrics for each pair of constellation points. These 2-D metrics are then combined to form eight 4-D metrics. If the coset bits are XORed at the transmitter, then this XORing be accounted for in the determination of the 4-D metrics prior to the normal decoding. A simple way to do accomplish this is to modify the 4-D metric computation table with the appropriate XOR values.

For example, let $C_2^i$ be the $i^{th}$ 2D coset and let $C_4^i$ be the $i^{th}$ 4D coset. By definition $$C_4^0 = \min\{C_2^{0 \oplus H_1} + C_2^{0 \oplus H_2}, C_2^{3 \oplus H_1} + C_2^{3 \oplus H_2}\}$$

Now, let $H_1$ be the 2 bit XOR pattern for the first 2D tone, and let $H_2$ be the 2 bit XOR pattern for the second 2D tone. The 4D metric computation is thus:

$$C_4^0 = \min\{C_2^0 + C_2^0, C_2^3 + C_2^3\}.$$

Therefore, the XOR operation can be removed at the receiver during the determination of the 4D metrics. Note that the 2 bit pattern is simply the first 2 bits of the XOR pattern implemented at the transmitter, and the higher level XOR bits can be removed after the trellis decoding.

The transmitter and receiver can also determine a loss in margin, if any, when the transmitter sends the Q-mode symbol based on a difference between the Q-mode symbol and the scrambled all-zeros symbol. This loss and margin occurs, for example, if the receiver does not map the all-zero symbol exactly to the Q-mode symbol. While it can be acceptable to have a loss in margin during transmission of the Q-mode symbol since the Q-mode symbol contains no information bits, in the case of a large margin loss, the transmitter and receiver must account for, for example, possible false alarms such as CRC errors, FEC errors, HEC errors, and the like, during the Q-mode symbol transmission. Otherwise data transmission is unaffected.

As discussed above, a loss in margin occurs, for example, if the receiver does not map the all-zero symbol exactly to the Q-mode symbol. Alternatively, a loss in margin can be reduced by using the fine gains. In particular, the receiver transparent Q-mode places restrictions on the values of the fine gains that may be used if it is desired to have a receiver without any loss in margin during the reception of the Q-mode symbol. For large constellations, such as, for example, $B_i \geq 6$ bits, there are several possible fine gain values that will align a point in the constellation with the Q-mode constellation point. For example, for smaller constellations, such as $B_i \leq 6$, there are fewer allowable fine gain values.

A number of exemplary issues can determine the number of fine gain values. In particular, the fine gain can be chosen such that either the exact Q-mode constellation point is used, or the fine gain is such that the actual Q-mode constellation point can be transmitted without a loss of margin even though the transmitted point is not the point that would have be chosen during a showtime transmission. In other words, in certain cases, the constellation point can be forced to the value that is needed for Q-mode without a loss of margin at the detector. This occurs when an all-zero input is mapped to the outermost constellation point along one of the 45° diagonals and the Q-mode symbol chosen to lie further along this diagonal.

Table 1 illustrates exemplary allowable fine-gain values (in dB) if a receiver operates with zero margin loss during Q-mode transmission.

TABLE 1

| $B_i$=1 | $B_i$=2 | $B_i$=3 | $B_i$=4 | $B_i$=5 | $B_i$=6 | $B_i$=7 | $B_i$=8 |
|---|---|---|---|---|---|---|---|
| <0 | <0 | −2.2 | <−2.55 | −2.3 | <−3.7 | −3.1 | <−4.2 |
|   |   |   | 0 | −1.1 | −2.4 | −2.5 | −3.6 |
|   |   |   |   | 0.45 | −1.4 | −2.0 | −3.1 |
|   |   |   |   | 3.0 | −0.75 | −1.7 | −2.0 |
|   |   |   |   |   | 0.92 | −1.1 | −2.6 |
|   |   |   |   |   | 2.08 | −0.40 | −2.4 |
|   |   |   |   |   |   | 0 | −2.3 |
|   |   |   |   |   |   | 0.44 | −2.1 |
|   |   |   |   |   |   | 1.5 | −1.7 |
|   |   |   |   |   |   | 2.1 | −1.7 |
|   |   |   |   |   |   | 3.8 | −1.5 |
|   |   |   |   |   |   |   | −1.4 |
|   |   |   |   |   |   |   | −1.3 |
|   |   |   |   |   |   |   | −1.2 |
|   |   |   |   |   |   |   | −1.1 |
|   |   |   |   |   |   |   | −0.75 |
|   |   |   |   |   |   |   | −0.57 |
|   |   |   |   |   |   |   | −0.20 |

TABLE 1-continued

| $B_i=$ 1 | $B_i=$ 2 | $B_i=$ 3 | $B_i=$ 4 | $B_i=$ 5 | $B_i=$ 6 | $B_i=$ 7 | $B_i=$ 8 |
|---|---|---|---|---|---|---|---|
| | | | | | | | 0 |
| | | | | | | | 0.21 |
| | | | | | | | 0.66 |
| | | | | | | | 1.2 |
| | | | | | | | 1.4 |
| | | | | | | | 2.0 |
| | | | | | | | 2.4 |
| | | | | | | | 2.8 |

With reference to Table 1, note that the exemplary fine gain values are valid for a Q-mode symbol with no fine gain, i.e., $g_{sync}=0$ dB.

For $B_i=1$ and $B_i=2$, the receiver may use any negative fine gain value since the Q-mode constellation point can be mapped to a point on the diagonal and therefore the Q-mode symbol will not effect the bit error rate (BER) performance and, in actuality, will increase the minimum distance properties of the constellation during the Q-mode transmission.

The same principles can be applied to all even constellations, i.e., the negative fine gains that result in the Q-mode constellation point being mapped to a point that is further from the origin than the outermost constellation point of the $B_i$ constellation do not result in a loss in margin during transmission of the Q-mode symbol. However, Exemplary advantages of the above-described receiver-transparent Q-mode include design flexibility for a receiver. In particular, there are a plurality of exemplary trade-offs that a receiver my make in implementing the exemplary systems and methods of this invention.

First, there is a data rate trade-off where a receiver may chose to use only the fine gain values in Table 1 if the receiver wants to assure loss in margin during reception of the Q-mode symbol. In doing so, there may be a small loss in data rate. However, this data rate loss may be an acceptable trade-off for a receiver that does not implement the complexities of detecting the entry and exit Q-mode symbols. For example, bit loading algorithms may be used to avoid a loss in data rate.

Alternatively, a receiver may chose not to use the fine gain values in Table 1 and still operate in a receiver-transparent Q-mode. As a result, there can be an effective decrease in margin during the reception of the Q-mode symbol. However, this decrease in margin during the Q-mode symbol will not effect the true information carrying symbols and therefore may be an acceptable trade-off for a receiver that does not wish to implement the complexities of detecting the Q-mode entry and exit symbols.

Furthermore, a receiver may chose to not use the fine gain values in Table 1 and not operate in a receiver-transparent Q-mode. In this case the receiver may chose to operate as in the current Q-mode proposals in G.dmt.bis and implement the complexities of detecting the entry and exit Q-mode functions. The receiver could notify the transmitter that it is not using the XOR and phase rotation functions and this could be accomplished by sending, for example, a message from the receiver to the transmitter indicating this type of operation. Alternatively, the receiver could send to the transmitter an $X_i$ table with all-zeros, such that the all-zeros input words are mapped to the true all-zeros constellation point.

Thus, one exemplary benefit of the systems and methods of this invention is that it allows the receiver to decide what method the receiver will be using for Q-mode. Therefore, the complexity burden to implement the Q-mode can be, for example, determined by the transmitter which, if the transmitter opts to implement Q-mode, the transmitter will implement the XOR scrambler and phase rotation even if the receiver decides to not use those functions, i.e., the receiver chooses to detect the Q-mode filler signal.

In the current Q-mode proposals in G.dmt, the Q-mode signal is randomized by alternating the reverb/segue signals based on a PRBS with periods longer than 4,000 symbols. The same method of randomization can be used in conjunction with the systems and methods of this invention. However, in this case, all DMT symbols, both information-carrying DMT symbols and the Q-mode symbol, are inverted based on the PRBS. This can be implemented by, for example, alternating the signs of all DMT symbols at the IFFT output based on the PRBS. Alternatively, the phase shift may be implemented as part of the phase rotation in the phase rotator 140. This will allow, for example, phase shifts other than just 180°, i.e., simple inversion. For example, the DMT symbols could be further randomized based on the 90° phase shifts.

Multicarrier ADSL systems typically use a synchronous bit scrambler before modulation in order to assure that the data bits being transmitted are as random as possible, this is important to keep the Peak to Average Power ratio low in multicarrier modems. The XOR scrambler 120 as discussed herein however, does not provide this randomization function since it is primarily just mapping bits from one pattern to another. In order to support the exemplary bit scrambling functions according to this invention, one of the following exemplary embodiments can be implemented:

First, a self-synchronizing scrambler can be placed before the XOR scrambler at the transmitter. If FEC coding is used, then the self-synchronizing scrambler would typically be placed before the FEC coder at the transmitter. The self-synchronizing scrambler is then reset after scrambling S bits. Upon the scrambler being reset, the initial scrambler state is reset to all zeros. Also, upon the scrambler reset, the scrambler feedback connections may be changed. For example, the scrambler feedback may be changed based on a different pseudo-random pattern. For example assume the scrambler was defined as:

$$D_n' = D_n \oplus D_{n-17} \oplus D_{n-25}',$$

where $D_n$ is the $n^{th}$ data bit at the input of the scrambler and $D_n'$ is the $n^{th}$ data bit at the scrambler output. After S bits are input to the scrambler, the scrambler is reset to the all zero state and the feedback connections changed to, for example, n−3 and n−20. These new connections can be updated, for example, based upon a second scrambler, and the number of connections need not be fixed. The value of S in the second scrambler, or for example a random number generator, that defines the new delay values would be known by the transmitter and the receiver so that the receiver could reverse the scrambling operation, i.e., descramble, upon scrambler reset.

Another method which does not involve changing the scrambler connections is based on defining S in such a way as to assure that a repetitive bit pattern at the input of the scrambler will not result in the same bit pattern being modulated on the same carriers in a plurality of DMT symbols. For example, this can be accomplished by defining S and L, where L is the number of bits modulated on all the carriers in single DMT symbol, to have no common factors other than 1, i.e., S and L are mutually co-prime.

Second, the data bits can be interleaved (shuffled) at some point prior to the XOR scrambler. This interleaving pattern can change from one DMT symbol to the next. The interleaving pattern could be known by the transmitter and receiver so that the operations can be reversed by the receiver. For example, assume that l is the number of bits modulated on all carriers in a single DMT symbol. A simple interleaver could move N bits to the end of the length L bit stream on the $N^{th}$ DMT symbol. For example if [B1, B2, B3, B4 ... BL] was the bit pattern at the input of the interleaver on the 3rd DMT symbol, then [B4, B5, B6, ... BL, B1, B2, B3] would be the bit pattern at the interleaver output. However, it should be appreciated that any other interleaving pattern can be used as long as it is known by the transmitter and the receiver.

As an alternative to the above exemplary embodiments of the systems and methods of this invention, instead of having the receiver define the $B_i$ and $G_i$ tables such that the Q-mode symbol is mapped to the all-zero symbol, the Q-mode symbol may be defined by the transmitter and be restricted to valid constellation points. The resulting Q-mode symbol may not have the exact PAR characteristics desired by the transmitter, but this Q-mode symbol will also map exactly to the all-zero symbol.

Constellation points chosen for the Q-mode symbol may be determined by the transmitter and communicated to the receiver after the $B_i$ and $G_i$ tables have been communicated. Alternatively, the constellation points chosen for the Q-mode symbol may be determined independently by the receiver and the transmitter based on the desired Q-mode symbol, such as a Q-mode symbol sent from the transmitter to the receiver during training.

Alternatively, tone reordering is another method that can be use during bit loading to achieve better mapping of the all-zero symbol to the Q-mode symbol. This can be helpful when trellis coding or some other code, such as turbo code, is used.

Alternatively still, the Q-mode signal may be also be pre-defined in a standard, or, for example, by a system provider, as opposed to be defined by the transmitter.

Furthermore, instead of exchanging the $X_i$ table, the transmitter and receiver may independently determine the $X_i$ values by finding the constellation points that are closest to the Q-mode constellation point. From this value, the transmitter and receiver can independently generate the XOR scrambler and the phase rotation values required. In order to determine the $X_i$ values independently, there should be a set of rules defined to ensure that the same constellation points are chosen by both the transmitter and receiver. This is important when two or more constellation points satisfy the condition of being closest in magnitude to the Q-mode point. For example, in the disclosed example, the constellation points (1,−5) and (5,−1) are the $\sqrt{2}$ distance from the origin. In this case, a rule such as "always pick the point that results in the smallest positive phase rotation value" can be chosen and this would ensure that both the transmitter and receiver would be pick the constellation point (1,−5). Alternatively, tables can be stored at one or more of the transmitter and receiver and values chosen from those tables for $X_i$ values.

In the case where a synchronized symbol is being transmitted every 69 DMT symbols, as is done in the G.992.1 and G.992.2 standards, a system with a receiver transparent Q-mode operating in accordance with the systems and methods of this invention can send a Q-mode symbol as a SYNC symbol. This way, when the transmitter enters the Q-mode, the SYNC symbol could continue to be sent unaltered.

Still further, on-line reconfiguration is possible such that when performing changes to the $B_i$ and $G_i$ tables during showtime, e.g., bit swapping on-line reconfiguration, in addition to the new $B_i$ and $G_i$ values, the receiver could also send to the transmitter the new corresponding $X_i$ values. If the receiver and the transmitter are independently determining the $X_i$ values, then it is not necessary for the receiver to send the new $X_i$ values during a showtime change of the $B_i$ and $G_i$ tables.

The ADSL framing parameters can also be configured in such a way as to ensure that non-scrambled data sequences will be mapped to different carriers from one DMT symbol to the next. As an example, ATM cell headers are not scrambled by the ATM TPS-TC. If the number of bits in a DMT symbol is chosen to be mutually co-prime with respect to the MUX data frame size in the ADSL modems, then when the SYNC bits are inserted into the data bit stream, the ATM cell headers will be mapped to different carriers from one DMT symbol to the next. Alternatively, if the number of bits in a DMT symbol is chosen to be mutually co-prime, with respect to the ATM cell size, such as 53 bits, then the ATM cell headers will be mapped to different carriers from one DMT symbol to the next. Alternatively still, if the number of bits in a DMT symbol is chosen to be mutually co-prime with respect to the Reed-Solomon code word size, e.g., 53 bits, then the ATM cell headers will be mapped to different carriers from one DMT symbol to the next. Obviously, configuring other framing parameters in this manner will have the same results.

Figure 7:
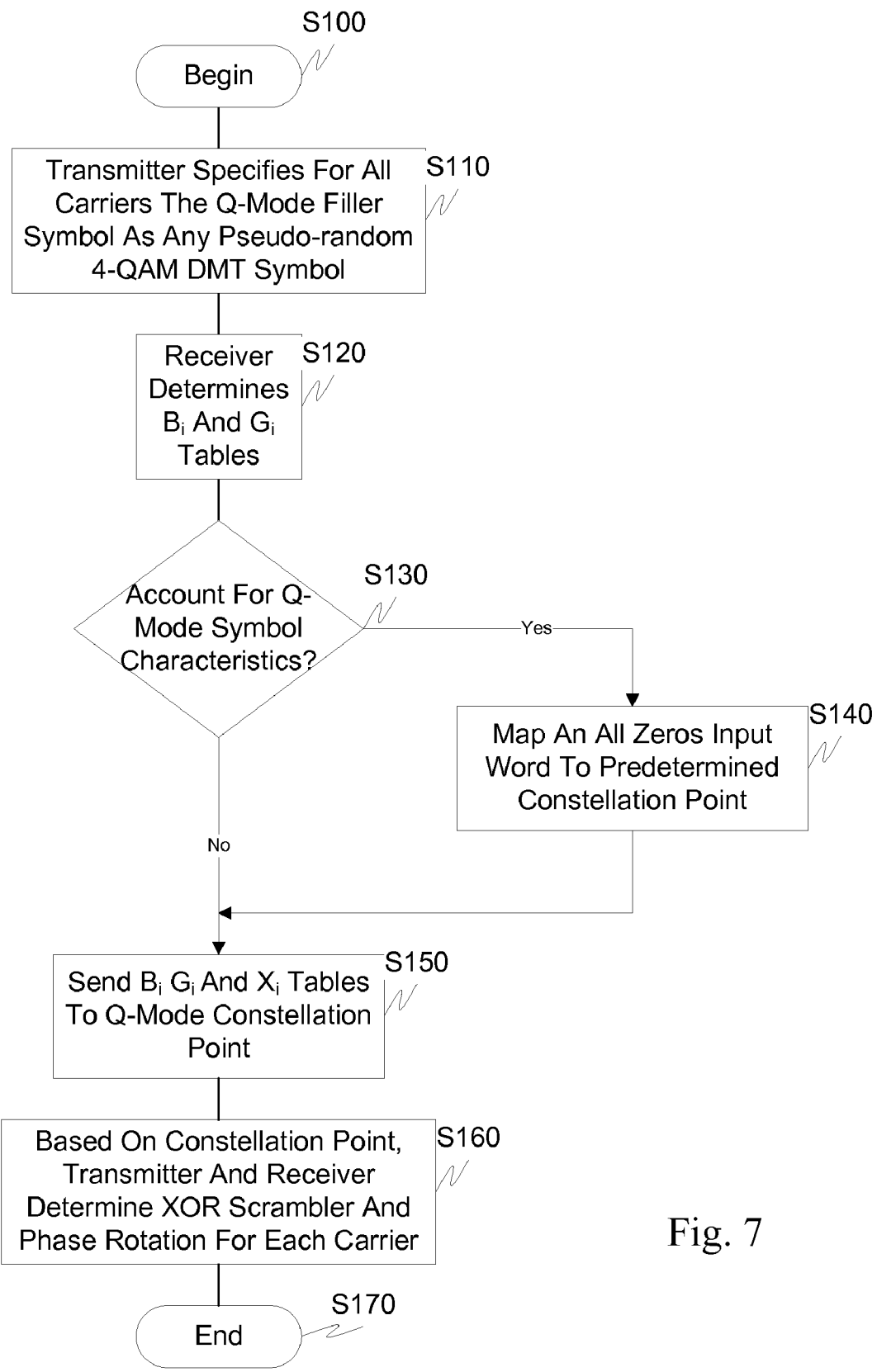
FIG. 7 is a flowchart illustrating an exemplary method of training the transmitter and receiver according to this invention.

FIG. 7 outlines an exemplary method of training a transmitter and a receiver according to this invention. In particular, control begins in step S100 and continues to S110. In step S110, the transmitter specifies on all carriers the Q-mode filler symbol as any pseudo-random 4-QAM DMT symbol. During this training, the transmitter sends the bit pattern ($Q_i$) for the Q-mode symbol to the receiver before the $B_i$ and $G_i$ tables are determined. Next, in step S120, the receiver determines the $B_i$ and $G_i$ tables. Alternatively, the receiver may take into account the Q-mode symbol characteristics during bit loading in order to ensure that a scrambled all-zero symbol is as similar as possible to the transmitter defined Q-mode symbol. As described above, this can be accomplished by mapping the all-zeros input word to a constellation point that is chosen to be as close as possible, or even identical, to the Q-mode constellation point for the carrier. Thus, in step S130, a determination is made whether the receiver will take into account the Q-mode symbol characteristics during bit loading. If the receiver does, control continues to step S140 where an all-zeros input word is mapped to a predetermined constellation point. Otherwise, control jumps to step S150.

In step S150, the receiver sends the $B_i$, $G_i$ and $X_i$ tables which contain the bit patterns of the chosen constellation points for each carrier that map the all-zeros input word ($w_i$) to the Q-mode constellation point ($Q_i$). Then, in step S160, based on the chosen constellation point, both the transmitter and receiver generate the XOR scrambler and phase rotation for each carrier. Control then continues to step S170 where the control sequence ends.

Figure 8:
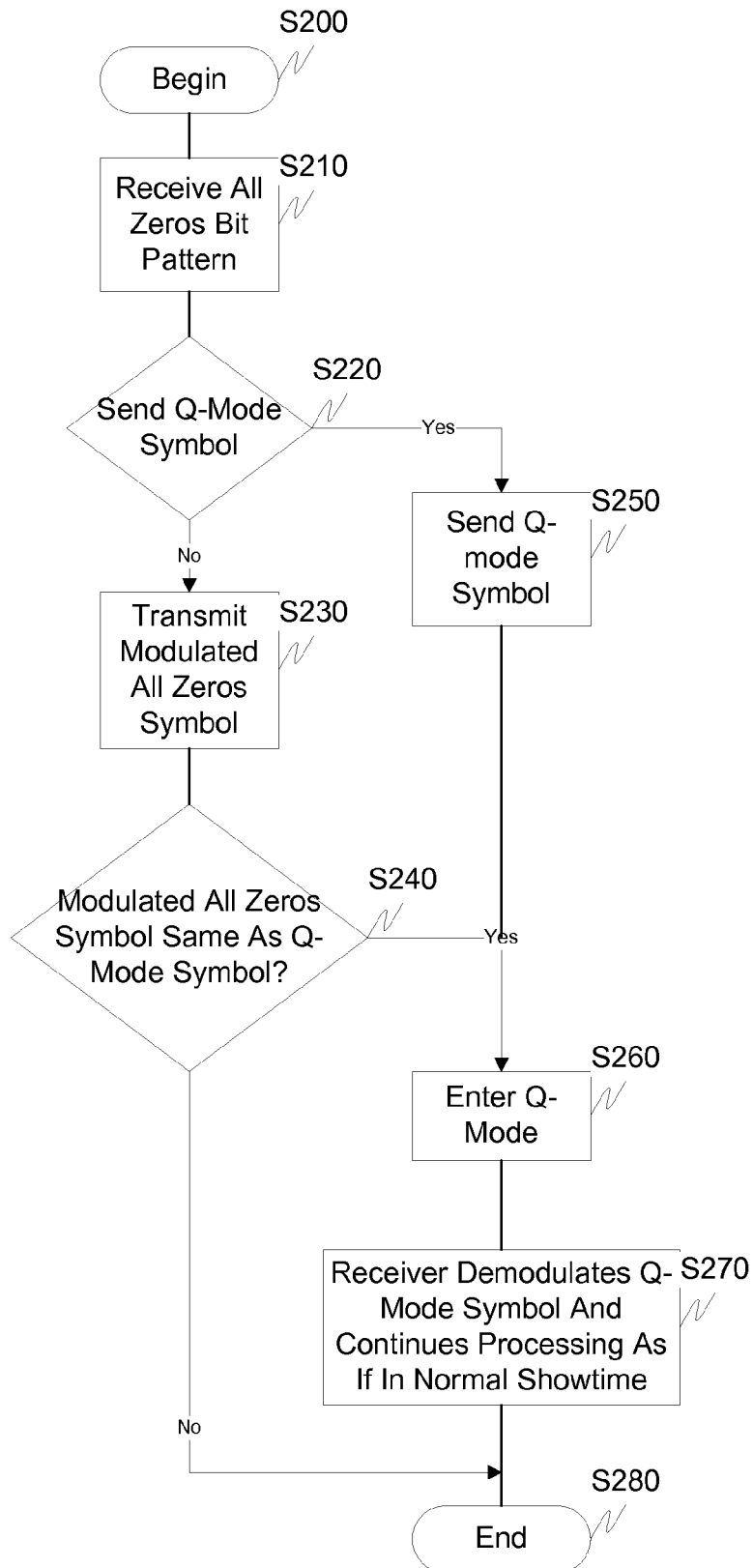
FIG. 8 is a flowchart illustrating an exemplary method of entering Q-mode according to this invention.

FIG. 8 outlines an exemplary method of entering Q-mode according to this invention. In particular, control begins in step S200 and continues to step S210. In step S210, an all zero bit pattern is received by the transmitter. Next, in step S220 a determination is made whether the Q-mode symbol will be sent to the receiver. If the Q-mode symbol is to be sent to the receiver, thus allowing the transmitter to enter Q-mode, control continues to step S250. Otherwise, control jumps to step S230.

In step S250, the Q-mode symbol is forwarded to the receiver. Next, in step S260, the transmitter enters Q-mode. Then, in step S270, the receiver demodulates the Q-mode symbol and continues processing as if the receiver was operating during normal showtime. Control then continues to step S280 where the control sequence ends.

In step S230, the transmitter transmits the modulated all-zero symbol. Then, in step S240, a determination is made whether the modulated all-zero symbol is the same as the Q-mode symbol. If the modulated all-zero symbol is the same as the Q-mode symbol control continues to step S260 where the transmitter enters Q-mode. Otherwise, control continues to step S280 where the control sequence ends.

Figure 9:
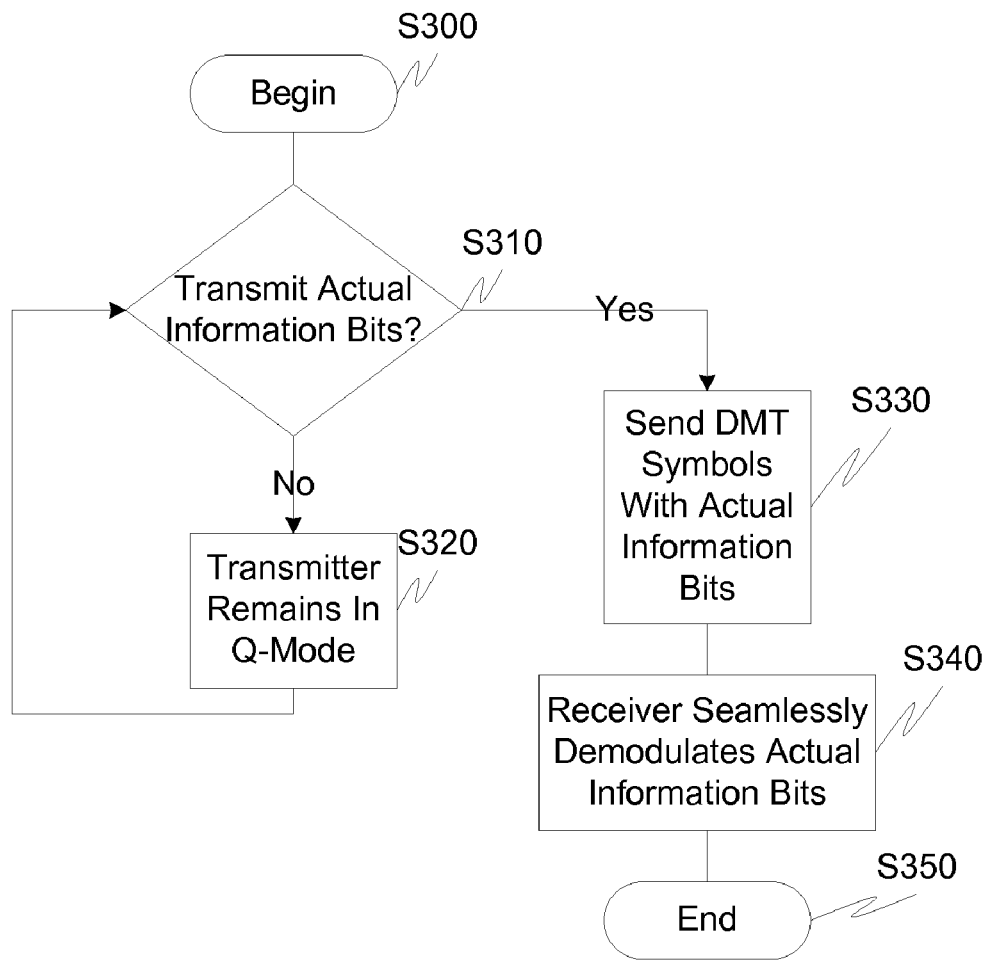
FIG. 9 is a flowchart illustrating an exemplary method of exiting Q-mode according to this invention.

FIG. 9 outlines an exemplary method of exiting Q-mode according to this invention. In particular, control begins in step S300 and continues to step S310. In step S310, a determination is made whether actual information bits are to be transmitted. If actual information bits are to be transmitted, control continues to step S330. Otherwise, control continues to step S320 where the transmitter remains Q-mode. Control then returns back to step S310.

In step S330, the transmitter will exit Q-mode by sending DMT symbols modulated with the real information bits. Next, in step S340, the receiver will receive and seamless demodulate the transmitted actual information bits. Control then continues to step S350 where the control sequence ends. Thus, the receiver will have transitioned through the transmitter cycling into and out of Q-mode without the receiver needing to detect this transition nor detect the exit of the transmitter from Q-mode.

The present invention for a receiver transparent Q-mode in a multicarrier transmission system can be implemented either on a DSL modem, such as an ADSL modem, or separate programmed general purpose computer having a communication device. The present method can also be implemented in a special purpose computer, a programmed microprocessor or a microcontroller and peripheral integrated circuit element, an ASIC or other integrated circuit, a digital signal processor, a hardwired or electronic logic circuit such as a discrete element circuit, a programmable logic device, such as a PLD, PLA, FPGA, PAL, or the like, and associated communications equipment.

Furthermore, the disclosed method may be readily implemented in software using object or object-oriented software development environments that provide portable source code that can be used on a variety of computers, workstations, or modem hardware and/or software platforms. Alternatively, the method may be implemented partially or fully in hardware using standard logic circuits or a VLSI design. Other software or hardware can be used to implement the methods in accordance with this invention depending on the speed and/or efficiency requirements of the system, the particular function, and the particular software and/or hardware or microprocessor or microcomputer(s) being utilized. Of course, the present method can also be readily implemented in hardware and/or software using any known later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, a modem, such as a DSL modem, or the like. In these instances, the methods and systems of this invention can be implemented as a program embedded in a modem, such as a DSL modem, or the like. The methods can also be implemented by physically incorporating operation equivalents of the methods into software and/or hardware, such as a hardware and software system of a multicarrier information transceiver, such as an ADSL modem, VDSL modem, network interface card, or the like.

While this invention has been described in conjunction with a number of embodiments, it is evident that many alternatives, modifications and variations would be or are apparent to those of ordinary skill in the applicable art. Accordingly, applicants intend to embrace all such alternatives, modifications, equivalents and variations that are within the spirit and the scope of this invention.

We claim:

1. A transceiver with a Q-mode power conserving capability comprising:
   an XOR scrambler that receives an all zeros input word;
   a QAM (Quadrature Amplitude Modulation) encoder connected to the XOR scrambler; and
   a phase rotator connected to the QAM encoder, wherein the XOR scrambler and the phase rotator cooperate to map the all zeros input word to a constellation point that is closest to a Q-mode constellation point for each carrier resulting in a different PMD (Physical Medium Dependent) scrambler and phase rotation for each carrier.

2. The transceiver of claim 1, further comprising a transmitter portion and a receiver portion, wherein the transmitter portion of the transceiver is capable of entering a transmitter Q-mode without the receiver portion of the transceiver entering a receiver Q-mode.

3. The transceiver of claim 2, wherein the receiver portion operates in Showtime and the transmitter portion operates in the transmitter Q-mode.

4. A method for a transceiver to enter a Q-mode power conserving capability comprising:
   receiving an all zeros input word; and
   mapping, by an XOR scrambler and a phase rotator, the all zeros input word to a constellation point that is closest to a Q-mode constellation point for each carrier resulting in a different PMD (Physical Medium Dependent) scrambler and phase rotation for each carrier.

5. The method of claim 4, wherein a transmitter portion of the transceiver is capable of entering a transmitter Q-mode without a receiver portion of the transceiver entering a receiver Q-mode.

6. The method of claim 5, wherein the receiver portion operates in Showtime and the transmitter portion operates in the transmitter Q-mode.

7. The method of claim 4, wherein the transceiver includes an ASIC.

8. The method of claim 4, wherein the transceiver includes a digital signal processor.

9. A non-transitory computer readable medium, comprising instructions stored thereon that, if executed by at least one processor, cause the at least one processor to execute a method for a transceiver to enter a Q-mode power conserving capability comprising:
   receiving an all zeros input word; and
   mapping, using an XOR scrambler and a phase rotator, the all zeros input word to a constellation point that is closest to a Q-mode constellation point for each carrier resulting in a different PMD (Physical Medium Dependent) scrambler and phase rotation for each carrier.

10. The method of claim 9, wherein a transmitter portion of the transceiver is capable of entering a transmitter Q-mode without a receiver portion of the transceiver entering a receiver Q-mode.

11. The method of claim 10, wherein the receiver portion operates in Showtime and the transmitter portion operates in the transmitter Q-mode.

12. The method of claim 9, wherein the transceiver includes an ASIC.

13. The method of claim 9, wherein the transceiver includes a digital signal processor.

* * * * *